United States Patent [19]

Ninomiya

[11] Patent Number: 5,764,968
[45] Date of Patent: Jun. 9, 1998

[54] CLOCK SUPPLY PERMISSION/INHIBITION CONTROL SYSTEM

[75] Inventor: Ryoji Ninomiya, Tokyo, Japan

[73] Assignee: Kabushiki Kaisha Toshiba, Kawasaki, Japan

[21] Appl. No.: 692,435

[22] Filed: Aug. 5, 1996

[30] Foreign Application Priority Data

Aug. 21, 1995 [JP] Japan ............................ 7-212081

[51] Int. Cl.⁶ ............................................. G06F 1/10
[52] U.S. Cl. ............................................. 395/560
[58] Field of Search ............................................. 395/560

[56] References Cited

U.S. PATENT DOCUMENTS 5,546,568 8/1996 Bland et al. ..................... 395/560 X
5,586,307 12/1996 Wong et al. ..................... 395/551
5,625,807 4/1997 Lee et al. ..................... 395/560

FOREIGN PATENT DOCUMENTS 60-195631 10/1985 Japan.

*Primary Examiner*—Thomas M. Heckler
*Attorney, Agent, or Firm*—Oblon, Spivak, McClelland, Maier & Neustadt, P.C.

[57] ABSTRACT

Each buffer circuit in a clock driver is enabled/disabled in accordance with clock drive control information set in a clock drive control register. Since the clock drive control information set in the register is programmable, the clock signal lines of a plurality of PCI devices can be selectively driven. Therefore, clock supply to unused PCI devices can be stopped, so that wasteful power consumption can be reduced.

16 Claims, 7 Drawing Sheets

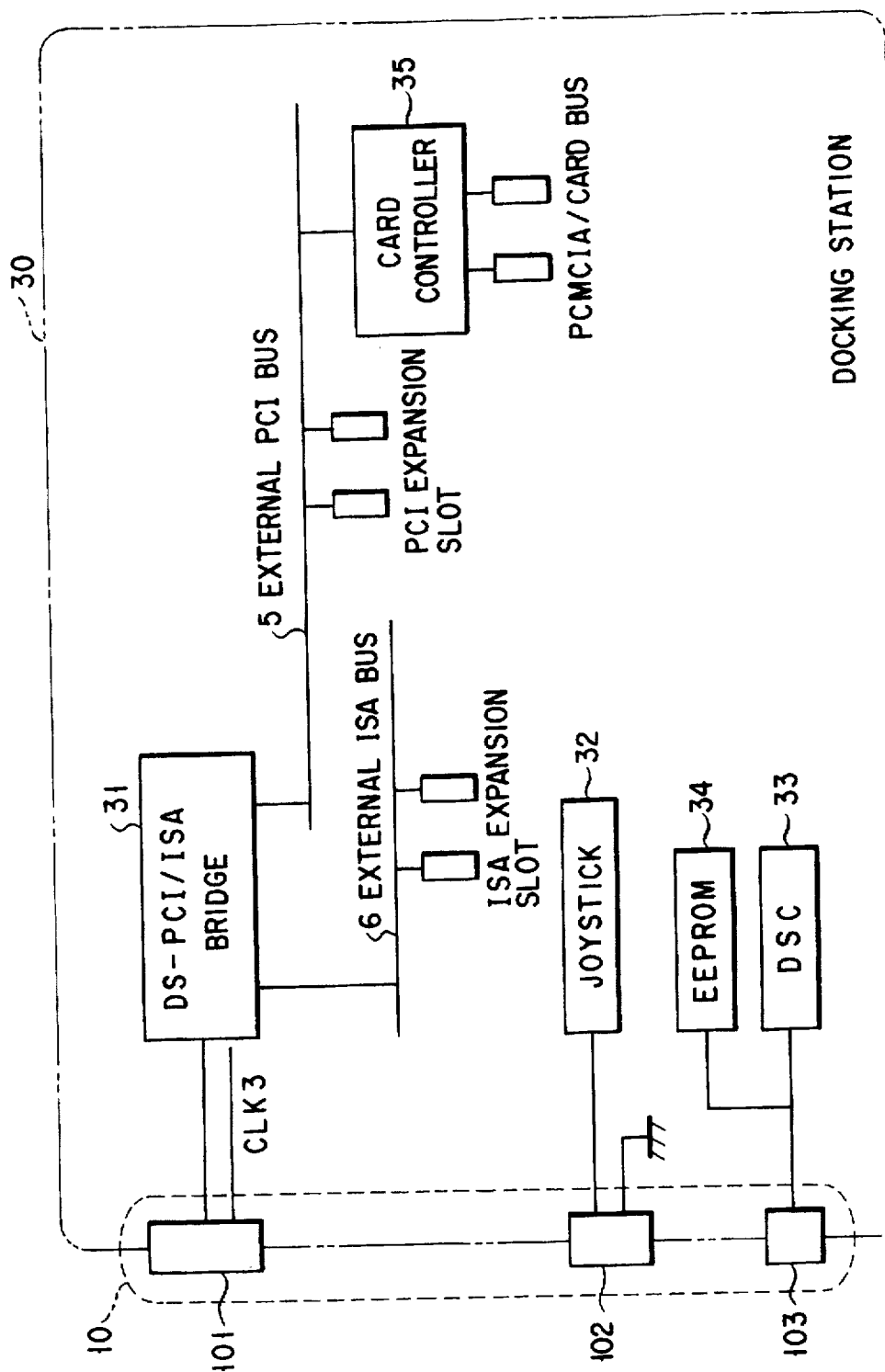
F I G. 2

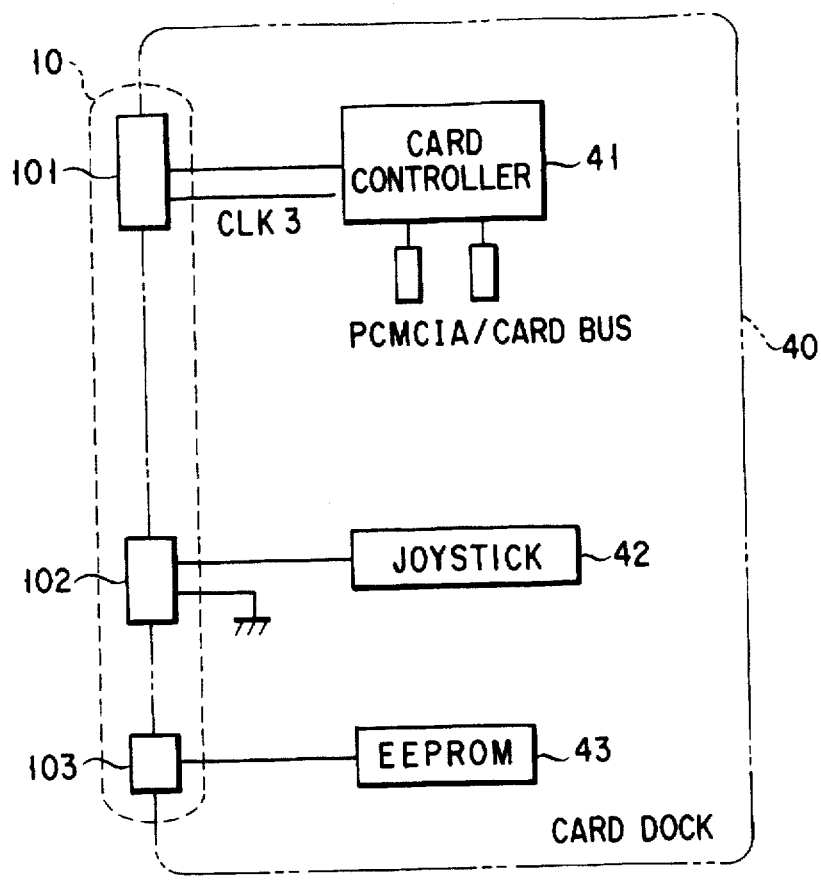
F I G. 3
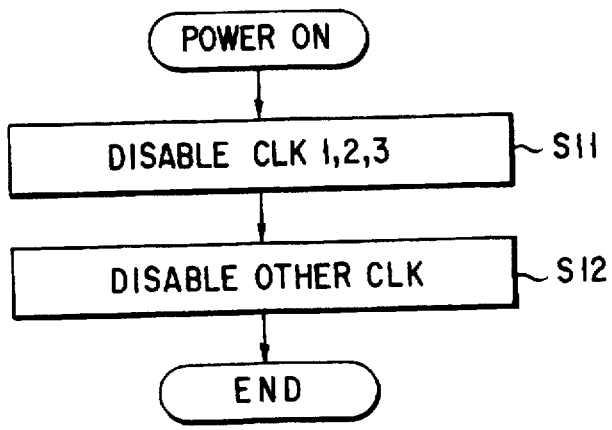
F I G. 4

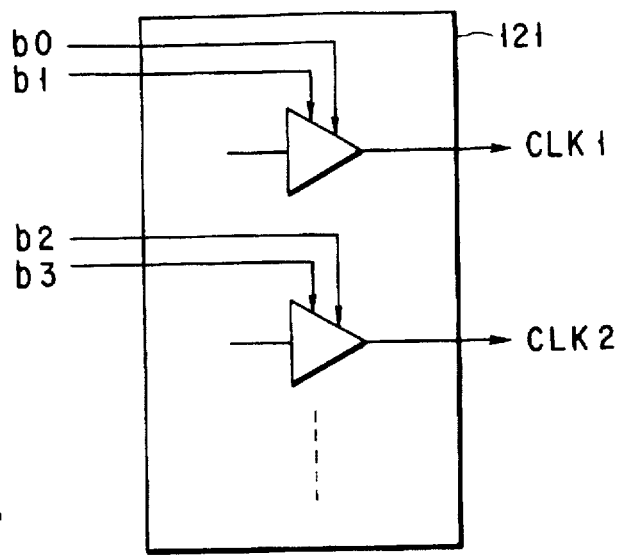
F I G. 7
| b1 | b0 | CLK1 |
|----|----|----|
| 1 | 1 | DISABLE |
| 1 | 0 | 4mA |
| 0 | 1 | 8mA |
| 0 | 0 | 12mA |
F I G. 8
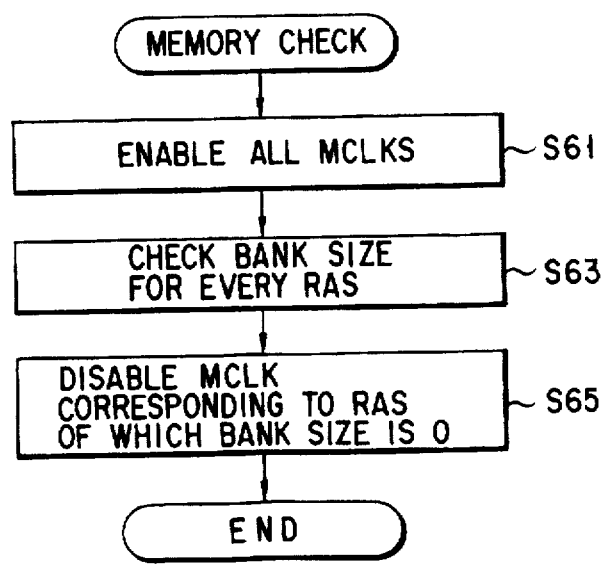
F I G. 10

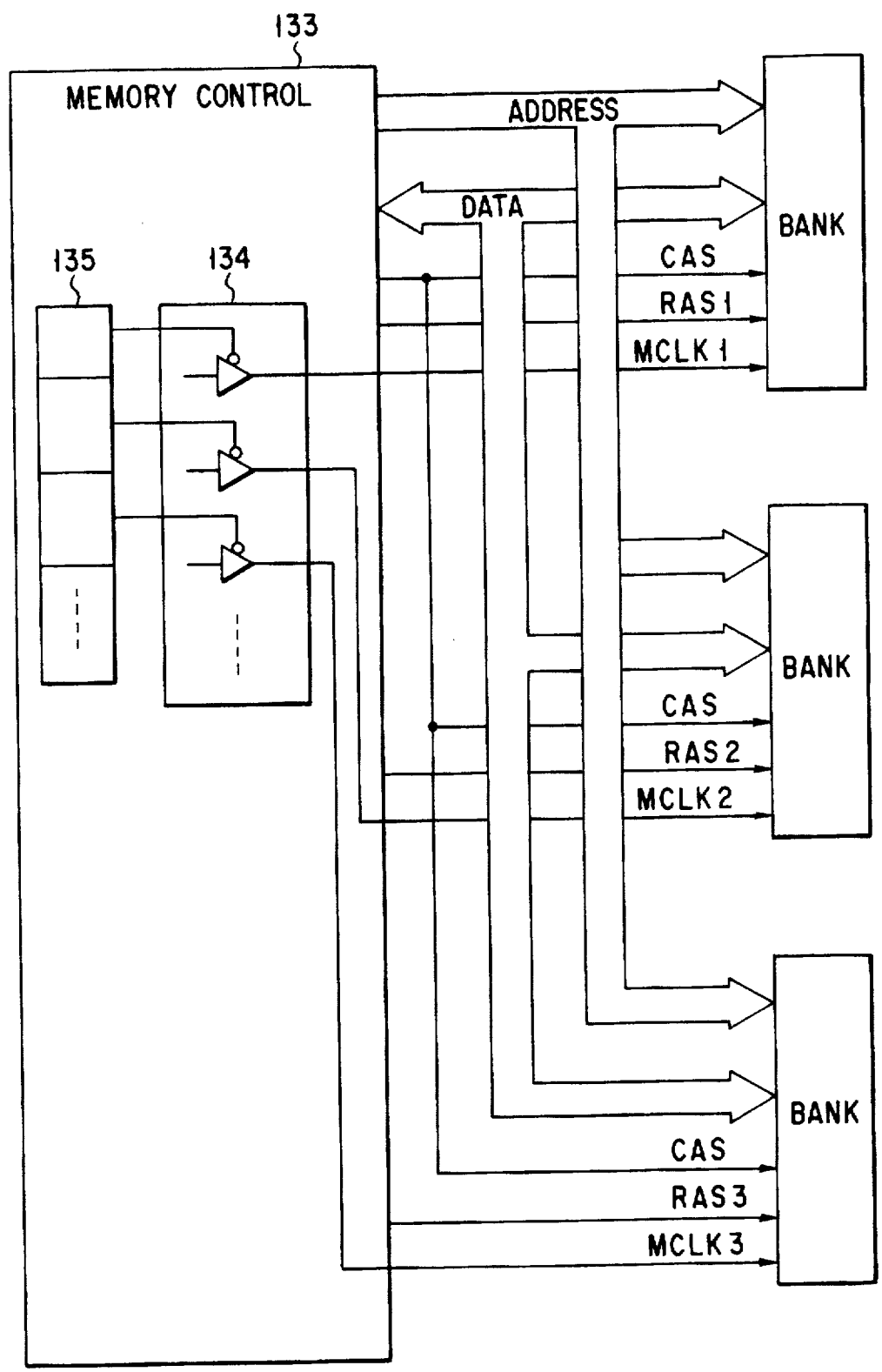
F I G. 9

CLOCK SUPPLY PERMISSION/INHIBITION CONTROL SYSTEM

BACKGROUND OF THE INVENTION

1. Field of the Invention

The present invention relates to a computer system and, more particularly, to a computer system in which clock signals are supplied to devices as the components of the system through different clock signal lines.

2. Description of the Related Art

The conventional mainstreams of system buses used for personal computers are ISA (Industry Standard Architecture) buses or EISA (Extended ISA) buses. Recently, however, PCI (Peripheral Component Interconnect) buses are employed to construct a system architecture independent on a processor.

In a PCI bus, almost all data transfer operations are performed based on block transfer. Each block transfer operation is realized using burst transfer. With this method, the PCI bus can realize a data transfer rate of, e.g., 133 Mbyte/second at maximum (when the data bus has a 32-bit width).

Therefore, employment of a PCI bus allows high-speed data transfer between I/O devices and between a system memory and an I/O device, resulting in high system performance.

For such a PCI bus architecture, clock skews must be minimized to realize a high-speed operation. For this purpose, clocks (PCI clocks) are individually supplied in units of system components.

More specifically, a plurality of devices on a system board are connected to different buffers in a clock driver through corresponding signal lines. PCI clocks are supplied from the plurality of buffers in the clock driver to these devices in a point-to-point manner. With this arrangement, as compared to a case wherein a single clock signal line is branched and supplied to a plurality of system components, the influence of signal reflection is largely decreased, so that the stability of clock signals can be ensured.

With this arrangement, however, since high-speed clocks are supplied to a large number of clock signal lines, the current consumption of the clock driver increases, resulting in an increase in power consumption of the system. In addition, since the conventional clock driver always supplies clock signals to all the clock signal lines, components in an inoperative state also receive high-speed clocks and waste the power.

SUMMARY OF THE INVENTION

It is an object of the present invention to provide a computer system which can selectively drive clock signal lines of a plurality of devices present as system components, thereby reducing the power consumption.

According to the present invention, there is provided a computer system comprising a plurality of devices connected to a bus of the computer system, a register in which programmable clock drive control information for designating permission/inhibition of clock supply in units of devices, and a clock drive unit having a plurality of buffer circuits for driving the clock signal lines of the plurality of devices, the buffer circuit permitting/inhibiting the drive operation of the clock signal line in accordance with the clock drive control information set in the register, wherein the clock signal lines of the plurality of devices can be selectively driven.

In this computer system, each buffer circuit in the clock drive unit is enabled/disabled in accordance with the clock drive control information set in the register. Since the clock drive control information set in the register is programmable, the clock signal lines of the plurality of devices can be selectively driven. Therefore, clock supply to unused devices can be stopped, so that wasteful power consumption can be reduced. In this case, clock supply to devices operated by device driver programs, e.g., devices for providing a modem or sound processing function is preferably stopped until the device drivers are installed in the system because these devices are not used until that time. This can be realized by rewriting the clock drive control information corresponding to the devices from a state representing clock supply inhibition to a state representing clock supply permission when the device drivers are read in the memory.

It is preferable that the current values for driving the clock signal lines can be programmably set in accordance with the clock drive control information by allowing to switch the current driving capability of each buffer circuit in the clock drive unit stepwise.

In a portable computer, an expansion unit can be connected to the computer main body as needed. A device serving as an interface to the expansion unit is not used until the expansion unit is connected. For this reason, for this device as well, clock supply is preferably stopped until the expansion unit is connected. This can be realized by arranging a means for detecting connection of the expansion unit and rewriting the clock drive control information in the register corresponding to the device from a state representing clock supply inhibition to a state representing clock supply permission when connection of the expansion unit is detected.

The above-described clock drive unit of the present invention can also be applied to clock control of memory modules such as a synchronous DRAM or Rambus which requires memory clock supply to each memory bank. In this case, the bank structure of a memory module (including an expanded memory) mounted in the system is checked, and the contents of the clock drive control information are determined in accordance with the check result. With this processing, for a memory module with any bank structure, wasteful clock supply to unused banks can be stopped. For example, assume a memory subsystem having four RAS lines RAS0 to RAS3 and four corresponding memory clock lines MCLK0 to MCLK3. If the memory module to be used has an 8-MB×1 bank structure, only the RAM line RAS0 and the memory clock line MCLKO are used. Clock supply to the three remaining memory clock lines MCLK1 to MCLK3 corresponding to unused banks is stopped.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 2 is a block diagram showing the arrangement of a docking station which can be mounted in the portable computer of the embodiment;

FIG. 3 is a block diagram showing the arrangement of a card dock which can be mounted in the portable computer of the embodiment;

FIG. 4 is a flow chart showing the sequence of PCI clock setting control upon power on of the portable computer of the embodiment;

FIG. 7 is a diagram showing another arrangement of a clock driver arranged in the portable computer of the embodiment;

FIG. 8 is a table showing the relationship between the current driving capability of the clock driver shown in FIG. 7 and clock control information;

FIG. 9 is a block diagram showing the arrangement of a memory control subsystem arranged in the portable computer of the embodiment; and FIG. 10 is a flow chart showing the sequence of a memory clock control operation for a memory bank in the portable computer of the embodiment.

DETAILED DESCRIPTION OF THE PREFERRED EMBODIMENTS

An embodiment of the present invention will be described below with reference to the accompanying drawings.

Figure 1:
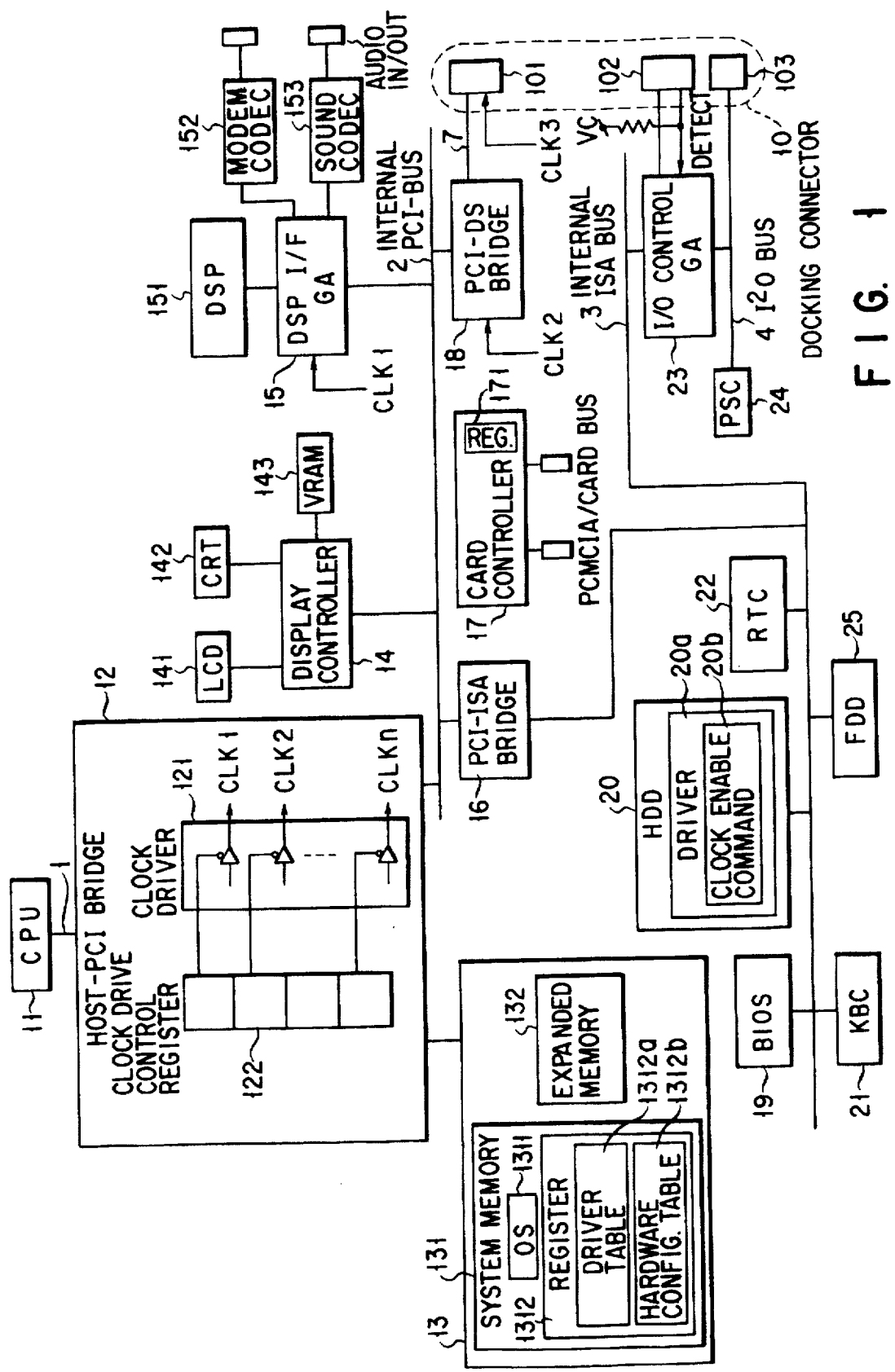
FIG. 1 is a block diagram showing the system configuration of a portable computer system according to an embodiment of the present invention.

FIG. 1 shows the configuration of a computer system according to an embodiment of the present invention. This computer system comprises a notebookor laptop-type portable computer which can be driven with batteries. A processor bus 1, an internal PCI bus 2, an internal ISA bus 3, and an I²C bus 4 are arranged on the system board. A docking station 30 shown in FIG. 2 or a card dock 40 shown in FIG. 30 is connected as needed by a user, as an expansion unit for function expansion, to a docking connector 10 arranged in the portable computer main body. The docking connector 10 comprises three connector elements 101 to 103, as shown in FIG. 1.

In the computer main body, a CPU 11, a host/PCI bridge unit 12, a memory 13, a display controller 14, a DSP interface gate array (DSP IF GA) 15, an internal PCI-ISA bridge unit 16, a card controller 17, a PCI-DS (DS: Docking Station) bridge unit 18, a BIOS ROM 19, an HDD 20, a keyboard controller 21, a real-time clock (RTC) 22, an I/O control gate array 23, a power supply controller (PSC) 24, and the like are arranged.

Of these components, devices serving as PCI devices connected to the internal PCI bus 2, i.e., the display controller 14, the DSP interface gate array (DSP IF GA) 15, the internal PCI-ISA bridge unit 16, the card controller 17, the PCI-DS (DS: Docking Station) bridge unit 18, and the like independently receive PCI bus clocks (CLK1 to CLKn) from a clock driver 121 of the host/PCI bridge unit 12.

The docking station 30 is used to add expansion devices such as PCI cards, ISA expansion cards, and PC cards. As shown in FIG. 2, an external PCI bus 5 and an external ISA bus 6 serving as expansion buses are arranged in the docking station 30, to which a PCI expansion slot and an ISA expansion slot are connected, respectively. A DS-PCI/ISA bridge unit 31, a joystick 32, a DS controller (DSC) 33, an EEPROM 34, and the like are also arranged in the docking station 30. The PCI bus clock (CLK3) from the clock driver 121 of the host/PCI bridge unit 12 is supplied to the DS-PCI/ISA bridge unit 31 through the connector element 101 of the docking connector 10.

The card dock 40 is used to expand a PC card and the like. As shown in FIG. 3, a card controller 41, a joystick 42, an EEPROM 43, and the like are arranged. The PCI bus clock (CLK3) from the clock driver 121 of the host/PCI bridge unit 12 is supplied to the card controller 41 through the connector element 101 of the docking connector 10.

The function and arrangement of each component arranged in the computer main body shown in FIG. 1 will be described below.

The CPU 11 is implemented by, e.g., a microprocessor "Pentium" available from Intel, U.S.A. The processor bus 1 directly connected to the input/output pins of the CPU 11 has a 64-bit data bus.

The memory 13 is a memory device for storing an operating system, a device driver, an application program to be executed, processed data, and the like and is constituted by a plurality of modules. The memory 13 comprises a system memory 131 mounted in advance on the system board, and an expanded memory 132 mounted by the user as needed. An OS (e.g., an operating system corresponding to "Windows 95") 1311 and a registry 1312 are loaded from the HDD 20 in the system memory 131 upon starting the system. The registry 1312 has a table 1312b for storing information associated with the hardware configuration of the system, and a driver table 1312a for storing the list of driver programs registered in the system.

As DRAM modules constituting the system memory 131 and the expanded memory 132, high-speed memories such as a synchronous DRAM or a Rambus, which require memory clock supply to each bank, are used.

The memory 13 is connected to the host/PCI bridge unit 12 through a dedicated memory bus having a 32- or 64-bit data bus. The data bus of the processor bus 1 can also be used as the data bus of the memory bus. In this case, the memory bus is constituted by an address bus and various memory control signal lines.

The host/PCI bridge unit 12 is a bridge LSI connecting the processor bus 1 and the internal PCI bus 2 and functions as one of the bus masters of the PCI bus 2. The host/PCI bridge unit 12 has a function of bidirectionally converting a bus cycle including data and an address between the processor bus 1 and the internal PCI bus 2 and a function of controlling access to the memory 13 through the memory bus.

The host/PCI bridge unit 12 also has a clock driver 121 and a clock drive control register 122. The clock driver 121 has a plurality of buffer circuits connected to the PCI devices through a plurality of clock signal lines in a point-to-point manner and independently supplies the PCI bus clocks (CLK1 to CLKn) to the PCI devices. Each PCI bus clock has a frequency of, e.g., 33 MHz.

Each buffer circuit can be enabled/disabled. In the enabled state, PCI clocks are output. In the disabled state, no PCI clocks are output. Enable/disable of each buffer circuit is determined on the basis of clock drive control information programmed in the clock drive control register 122. The clock drive control register 122 is a register mapped in, e.g., a configuration address space and can be read/write-accessed by the CPU 11. Therefore, clock supply can be permitted/inhibited in units of PCI devices in accordance with the information programmed in the clock drive control register 122.

The internal PCI bus 2 is a clock synchronous type input/output bus. All cycles on the internal PCI bus 2 are performed in synchronism with PCI bus clocks. The frequency of the PCI bus clock is 33 MHz at maximum. The PCI bus 2 has an address/data bus used by time division. The address/data bus has a 32-bit width.

The data transfer cycle on the PCI bus 2 is constituted by an address phase and at least one data phase subsequent to the address phase. In the address phase, an address and a transfer type are output. In the data phase, 8-, 16-, 24-, or 32-bit data is output.

The display controller 14 is one of the bus masters of the PCI bus 2, like the host/PCI bridge unit 12, and displays image data in a video memory (VRAM) 143 on an LCD 141 or an external CRT display 142.

The DSP interface gate array 15 is one of the PCI devices and constitutes a DSP system for performing various sound processing or telephone/data communication processing in cooperation with a DSP 151, a MODEM (CODEC) 152, and a sound CODEC 153.

The DSP interface gate array 15 communicates with the DSP 151, the MODEM (CODEC) 152, and the sound CODEC 153 under the control of a dedicated device driver program which is read in the memory 13 and executed, thereby controlling sound processing or communication processing using the digital signal processing function of the DSP 151.

The DSP system constituted by the DSP interface gate array 15, the DSP 151, the MODEM (CODEC) 152, and the sound CODEC 153 does not work upon turning on the power supply of the computer main body. The DSP system starts its function until the device driver program is installed in the operating system.

In the system of this embodiment, to decrease the wasteful power consumption until the device driver program is installed, supply of the PCI bus clock (CLK1) to the DSP interface gate array 15 is started after the device driver program is read in the memory 13. Until that time, supply of the PCI bus clock (CLK1) is stopped.

The internal PCI-ISA bridge unit 16 is a bridge LSI connecting the internal PCI bus 2 and the internal ISA bus 3 and functions as one of the PCI devices. The internal PCI-ISA bridge unit 16 incorporates a PCI bus arbiter, a DMA controller, and the like. The internal ISA bus 3 is connected to the BIOS ROM 19, the HDD 20, the keyboard controller 21, the RTC 22, and the I/O control gate array 23.

The card controller 17 is one of the PCI devices and controls PC cards based on PCMCIA or card bus specifications. The card controller 17 has a register 171. Upon hot insertion of a PCMCIA card, a specific bit (flag) of this register 171 is set. Therefore, the OS can recognize hot insertion of the PCMCIA card by polling the register 171.

The PCI-DS bridge unit 18 is a bridge LSI connecting the internal PCI bus 2 and a docking bus 7 corresponding to a PCI bus and functions as one of the PCI devices. The docking bus 7 extends to the outside through the connector element 101 of the docking connector 10 and is connected to the docking station 30 or the card dock 40.

The PCI-DS bridge unit 18 is used as an interface between the internal PCI bus 2 and the docking station 30 or the card dock 40, so the PCI-DS bridge unit 18 is not used until the docking station 30 or the card dock 40 is connected to the docking connector 10. Upon hot insertion of the docking station 30 or the card dock 40, an event flag provided in the BIOS (more specifically, the BIOS has a PnP (plug and play) table in which a memory address storing a flag representing hot insertion of the docking station is stored) is set. By polling this flag, the OS determines that some event for the docking station has occurred. Subsequently, the OS inquires of the BIOS about the contents of the event, so that the OS can recognize hot insertion of the docking station 30.

In the system of this embodiment, therefore, when the docking station 30 or the card dock 40 is not connected to the docking connector 10, supply of the PCI bus clock (CLK2) to the PCI-DS bridge unit 18 is stopped.

Supply of the PCI bus clock (CLK3) which is output externally through the docking connector 10 is also stopped when the docking station 30 or the card dock 40 is not connected to the docking connector 10.

The I/O control gate array 23 is a bridge LSI connecting the internal ISA bus 3 and the I2C bus 4 and incorporates a plurality of register groups which can be read/write-accessed by the CPU 11. By using these register groups, communication between the CPU 11 and the power supply controller 24 on the I2C bus 4 is enabled.

The I²C bus 4 is a bidirectional bus constituted by one clock signal line and one data line (SDA) and extends to the outside through the connector element 103 of the docking connector 10.

The I/O control gate array 23 detects docking/undocking between the computer main body and the docking station 30 or the card dock 40 by monitoring the voltage of a predetermined pin (DETECT pin) of the connector element 102 of the docking connector 10. More specifically, as shown in FIGS. 2 and 3, in the docking station 30 or the card dock 40, the DETECT pin of the connector element 102 is grounded. The DETECT pin is pulled up on the system board of the computer main body. Therefore, when the docking station 30 or the card dock 40 is connected to the computer main body, the voltage of the DETECT pin goes "L". When the docking station 30 or the card dock 40 is separated from the computer main body, the voltage of the DETECT pin goes "H". The I/O control gate array 23 detects docking/undocking between the computer main body and the docking station 30 or the card dock 40 in accordance with this change in voltage of the DETECT pin. The CPU 11 is informed of this detection result by an interrupt signal or the like.

The HDD 20 stores a driver program 20a of hardware constituting the system. The device driver program for controlling clock supply is constituted to issue a clock enable command 20b (to be described later).

An FDD 25 is used to load the driver program of hardware connected to the system in the system memory 131 when the driver program is absent.

The components of the docking station 30 shown in FIG. 2 will be described below.

As described above, the docking station 30 is an expansion unit which can be detachably mounted in the portable computer main body. The housing of the docking station 30 has a mounting surface for accommodating the portable computer main body, and an autoloading mechanism for docking the docking station 30 and a computer main body 100 under the control of the DS controller 33 when the portable computer main body is mounted on the mounting surface. The docking station 30 also has an eject switch, a power switch, and the like, in addition to a detection switch for detecting that the portable computer is set and informing the DS controller 33 of it. The eject switch is an operation switch for releasing, from the docking station 30, the computer main body docked with the docking station 30 by the autoloading mechanism. When the eject switch is depressed, the motor of the autoloading mechanism is rotated in the reverse direction, and the portable computer main body is electrically separated from the docking station 30 and released.

The DS-PCI/ISA bridge unit 31 of the docking station 30 is a bridge LSI connecting the docking bus 7 extending from the computer main body to the docking station 30, the external PCI bus 5, and the external ISA bus 6. The DS-PCI/ISA bridge unit 31 is one of the PCI devices and operates in synchronism with the PCI bus clock (CLK3). The PCI bus clock (CLK3) is supplied after it is detected that the docking station 30 is connected to the compute main body, as described above.

The DS controller 33 is a microcomputer for controlling ON/OFF of the power supply of the docking station 30 and docking/undocking between the portable computer main body and the docking station 30. The DS controller 33 communicates with the power supply controller 24 and the I/O control gate array 23 of the computer main body by using the I2C bus 4.

The EEPROM 34 stores information necessary for hot insertion, such as the attributes (addresses, DMA channels, IRQ (interrupt request) numbers, and the like) of expansion cards mounted in the expansion slots of the docking station 30. The hot insertion information is read from the EEPROM 34 by the I/O control gate array 23 through the I2C bus 4 under the control of the system BIOS of the BIOS ROM 19 when the computer main body and the docking station 30 are docked, or when the computer main body or the docking station 30 is powered on.

A card controller 35 controls PC cards based on the PCMCIA/card bus specifications, like the card controller 17 in the computer main body.

The card dock 40 shown in FIG. 3 is an expansion unit which can be detachably mounted in the portable computer main body.

The card controller 41 provided in the card dock 40 controls PC cards based on the PCMCIA/card bus specifications and operates in synchronism with the PCI bus clock (CLK3). The PCI bus clock (CLK3) is supplied after it is detected that the card dock 40 is connected to the compute main body, as described above.

The EEPROM 43 stores hot insertion information (information necessary for plug and play) such as the attributes of PC cards mounted in the expansion slots of the card dock 40. The hot insertion information is read from the EEPROM 43 by the I/O control gate array 23 through the I2C bus 4 under the control of the system BIOS of the BIOS ROM 19 when the computer main body and the card dock 40 are docked, or when the computer main body or the card dock 40 is powered on.

A PCI bus clock supply operation in the system of this embodiment will be described below.

When the computer main body shown in FIG. 1 is powered on, the system BIOS sets clock drive control information in the clock drive control register 122. The clock drive control information is used to permit/inhibit clock supply in units of PCI devices, as described above. If the clock drive control information is "0", a buffer circuit corresponding to the clock driver 121 is set in the enabled state, so that a corresponding clock signal line is driven by the buffer circuit. If the clock drive control information is "1", the buffer circuit corresponding to the clock driver 121 is set in the disabled state, so the clock signal line is not driven by the buffer circuit.

As shown in FIG. 4, to stop generation of the PCI bus clock (CLK1) to be supplied to the DSP interface gate array 15, the PCI bus clock (CLK2) to be supplied to the PCI-DS bridge unit 18, and the PCI bus clock (CLK3) to be supplied to the DS-PCI/ISA bridge unit 31 of the docking station 30 or the card controller 41 of the card dock 40, the system BIOS first sets clock drive control information corresponding to these PCI devices, i.e., the PCI bus clocks CLK1 to CLK3 to be "1"(step S11). Subsequently, the system BIOS sets the clock drive control information corresponding to all other PCI devices to be "0" such that clock supply to these PCI devices is permitted (step S12). With this processing, even when the system is powered on, supply of the PCI bus clocks CLK1 to CLK3 is stopped.

An operation of starting supply of PCI bus clocks CLK1 to CLK3 will be described below with reference to FIGS. 5 and 6.

Figure 5:
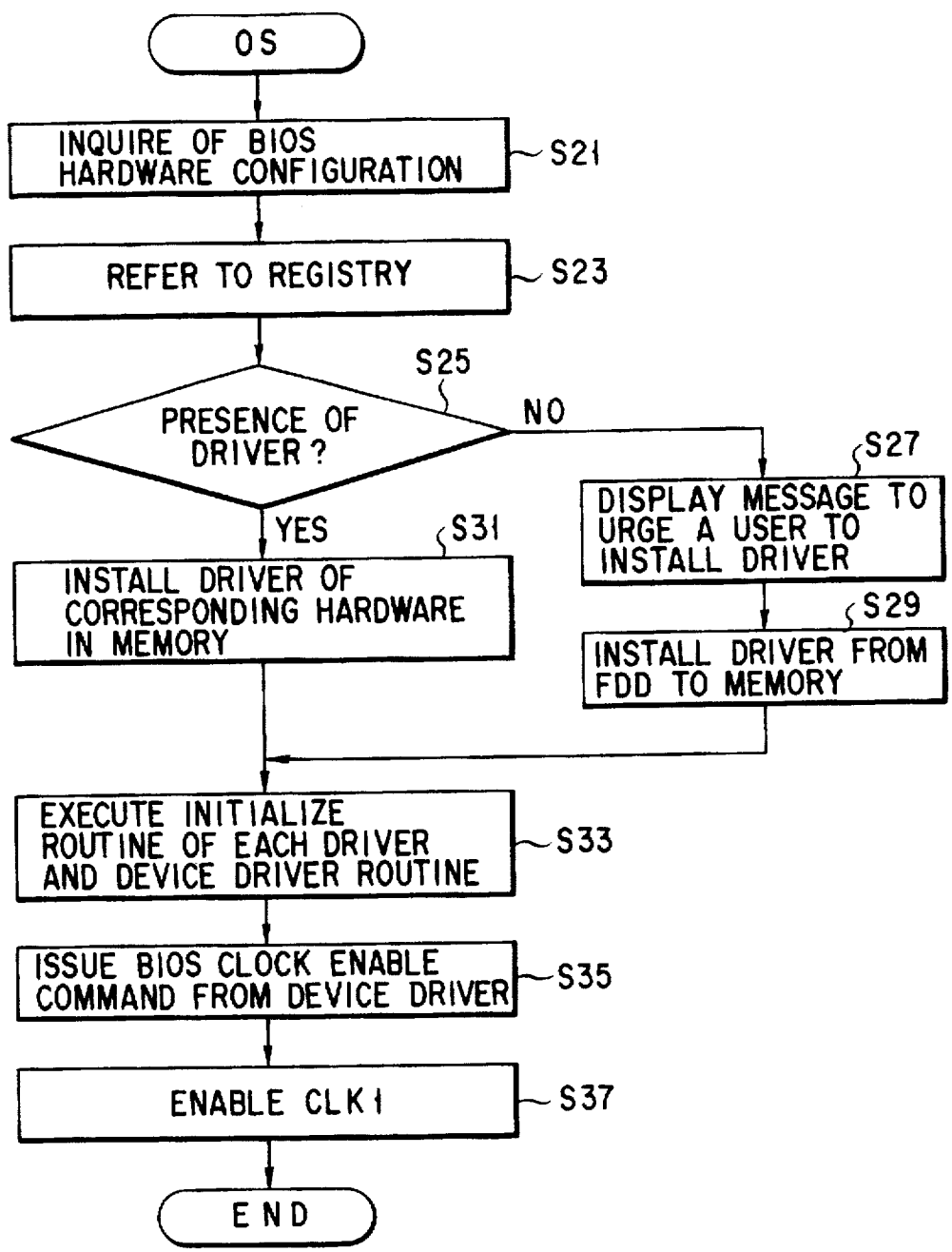
FIG. 5 is a flow chart showing the sequence of a PCI block control operation for a DSP (Digital Signal Processor) system of the portable computer of the embodiment.

As shown in FIG. 5, when the power is turned on, the OS inquires of the BIOS about the hardware configuration of the system, thereby recognizing the hardware connected to the system (step S21). The OS refers to the registry 1312 (step S23) to determine whether the driver of the hardware (e.g., the device driver for a DSP system having a message modem/sound function) is stored in the HDD 20 (step S25). If NO in step S25, the OS displays a message to urge the user to install the driver routine in step S27. In step S29, the user installs the driver routine from the FDD 25 in the system memory 131.

If YES in step S25, the OS installs the driver routine of the corresponding hardware in the system memory 131 in step S31. In step S33, the OS executes an initialize routine to initialize each device driver and the device drive routine. In step S35, a clock enable command is issued from the device driver to the system BIOS (step S35). In response to the clock enable command, the system BIOS sets the clock drive control information corresponding to the DSP interface gate array 15, i.e., the PCI bus clock (CLK1) to be "0" (step S37). With this processing, supply of the PCI bus clock (CLK1) to the DSP interface gate array 15 is started.

As described above, clock supply to the DSP interface gate array 15 is stopped until the device driver is installed in the system. After the device driver is installed., the clock is supplied. Therefore, wasteful power consumption until the device driver is installed can be reduced.

Figure 6:
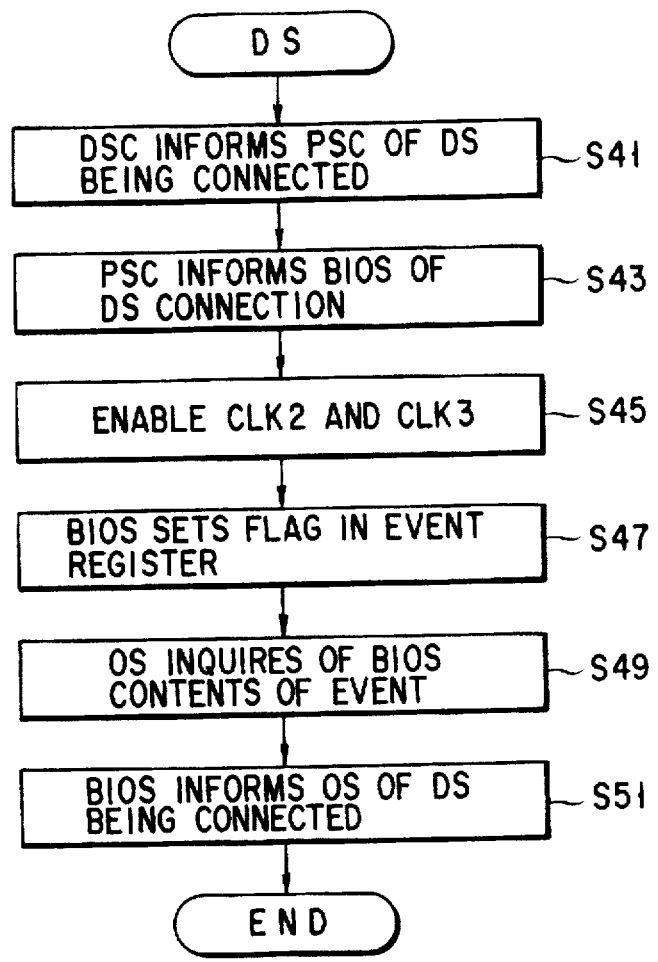
FIG. 6 is a flow chart showing the sequence of the PCI clock control operation for a device associated with the docking station of the portable computer of the embodiment.

When the docking station 30 or the card dock 40 is connected to the docking connector 10 of the computer main body, the DSC 33 (FIG. 2) informs the PSC 24 of connection of the DS 30 in step S41 of FIG. 6. In step S43, the PSC 24 informs the BIOS that the DS 30 is connected to the computer main body. In step S45, the BIOS sets the clock drive control information corresponding to the PCI-DS bridge unit 18, i.e., the PCI bus clock (CLK2) to be "0", and at the same time, sets the clock drive control information corresponding to the PCI bus clock (CLK3) to be output to the docking station 30 or the card dock 40 to be "0". In step S47, the BIOS sets the flag of the event register provided in the BIOS. By polling this event register, the OS confirms that the flag is set. In step S49, the OS inquires of the BIOS about the contents of the event. In response to this inquisition, the BIOS informs the OS of connection of the DS 30 (step S51).

As described above, for the PCI-DS bridge unit 18 serving as the PCI device of the docking station 30 or the card dock 40, or an interface between the docking station 30 or the card dock 40 and the computer main body as well, clocks are supplied after the docking station 30 or the card dock 40 is connected. When the docking station 30 or the card dock 40 is not connected, no clocks are supplied.

FIG. 7 shows another arrangement of the clock driver 121 shown in FIG. 1.

Referring to FIG. 7, each buffer circuit of the clock driver 121 is constituted such that the current driving capability can be switched stepwise. The clock drive control information is constituted by two bits per buffer circuit. In this case, a relationship as shown in FIG. 8 is established between the two bits of the clock drive control information and the drive state of the clock signal line.

As for the buffer circuit for generating the clock CLK1, if two bits "b1" and "b0" of the clock drive control information are "1" and "1", the buffer circuit is disabled, so that generation of the clock CLK1 is stopped. If the two bits "b1" and "b0" are "1" and "0","0" and "1", or "0" and "0", the buffer circuit is enabled to drive the clock signal line for the clock CLK1 at 4 mA, 8 mA, or 12 mA.

Such current driving capability switching can be realized by, e.g., arranging two buffers for 4 mA and 8 mA for each buffer circuit and enabling/disabling these buffers.

When this clock driver 121 is used, a power saving mode wherein the clock signal line is driven at 4 mA instead of stopping the clock supply can also be realized.

FIG. 9 shows the connection relationship between a memory control subsystem 133 incorporated in the host/PCI bridge unit 12 shown in FIG. 1 and the memory 13.

Each of the system memory 131 and the expanded memory 132, which are used as the memory 13, is constituted by a plurality of DRAM modules each having at least one bank. Each bank is constituted by a plurality of synchronous DRAMs or DRAM chips based on Rambus. The banks are connected to the memory address bus and the memory data bus in parallel. RAS lines and the memory clock (MCLK) lines are individually supplied to the banks. A CAS line is commonly supplied to the banks.

Drive of the memory clock lines is controlled by a clock driver 134 and a clock drive control register 135 which are incorporated in the memory control subsystem 133. The clock driver 134 and the clock drive control register 135 correspond to the clock driver 121 and the clock drive control register 122 shown in FIG. 1, respectively.

More specifically, the clock driver 134 has a plurality of buffer circuits connected to the banks through the plurality of memory clock lines in a point-to-point manner and independently supplies memory clocks (MCLK1 to MCLKn) in units of banks. Each memory clock has a frequency of, e.g., 60 MHz.

Each buffer circuit can be enabled/disabled. In the enabled state, a memory clock is output. In the disabled state, no memory clock is output. Enable/disable of each buffer circuit is determined by the clock drive control information programmed in the clock drive control register 135. The clock drive control register 135 is a register mapped in, e.g., a configuration address space and can be read/write-accessed by the CPU 11. Therefore, clock supply can be controlled in units of banks by the information programmed in the clock drive control register 135.

In this system, memory clock supply to unused banks, i.e., memory clock supply to unused RAS lines of the plurality of prepared RAS lines is stopped. The unused RAS lines are determined by the number of RAS lines prepared for the system memory 131 and the expanded memory 132 and the bank structure of the actually mounted memory modules.

For example, when two RAS lines RAS1 and RAS2 are connected to the memory slot for the system memory 131, and a memory module having a 4-MB×1 bank structure is connected to the slot as an expanded memory, only the RAS line RAS1 is used while the RAS line RAS2 is not used. Similarly, when three RAS lines RAS3 to RAS5 are connected to the memory slot for the expanded memory 132, and a memory module having a 4-MB×2 bank structure is connected to the slot as an expanded memory, only the RAS lines RAS3 and RAS4 are used while the RAS line RAS5 is not used.

No bank is connected to these unused RAS lines, so the memory clock lines corresponding to the RAS lines are not used. Therefore, when drive of the memory clock lines corresponding to the unused RAS lines, i.e., the unused banks is inhibited by the clock control information, wasteful power consumption can be reduced.

FIG. 10 shows an operation of setting the clock control information in the clock drive control register 135.

The system BIOS checks the memory structure in response to power on of the system. In this case, all- "0" clock control information is set in the clock drive control register 135 first, and all the memory clocks MCLK are enabled (step S61).

The system BIOS checks the size of banks connected to the RAS lines by write/read comparison or the like to detect unused banks (bank size=0) (step S63). The clock control information of memory clocks corresponding to the RAS lines of which bank size is 0 is set to be "1", thereby inhibiting drive of the memory clocks (step S65).

With this processing, wasteful clock supply to not only unused PCI devices but also unused memory banks is stopped, so that the power consumption can be further reduced.

The arrangement shown in FIGS. 7 and 8 can also be applied to the clock driver 134 and the clock drive control register 135 which are incorporated in the memory control subsystem 133.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A computer system comprising:

a system bus;

a plurality of devices connected to said system bus;

clock signal lines, coupled to said plurality of devices, for supplying clock signals to said plurality of devices;

a system memory connected to said system bus;

a storage medium for storing device driver programs for controlling operations of said plurality of devices;

a register in which programmable clock drive control information is set for designating one of enable and disable of a drive operation of said clock signal lines in units of said devices;

a clock drive unit, coupled to said register and said clock signal lines, having a plurality of buffer circuits for one of enabling and disabling the drive operation of said clock signal lines of said plurality of devices in accordance with the clock drive control information set in said register;

means for reading the device driver programs stored in said storage medium into said system memory; and means for setting the clock drive control information in said register to disable the drive operation of said clock signal lines of said plurality of devices in an initial state, and rewriting the clock drive control information in said register to enable the drive operation of said clock signal lines of said devices controlled by the read device driver programs when the device driver programs of said plurality of devices are read by said read means into said system memory.

2. A system according to claim 1, wherein said buffer circuit of said clock drive unit has means for switching stepwise a current driving capability of driving said clock signal line in accordance with the clock drive control information set in said register.

3. A computer system comprising:
a computer main body; and
an expansion unit which is detachably connected to said computer main body, and on which expansion devices can be mounted;
said computer main body including:
a system bus;
an expansion connector for detachably connecting said expansion unit to said computer main body;
a device connected between said system bus and said expansion connector and serving as an interface between said system bus and said expansion unit;
detecting means for detecting that said expansion unit is connected to said expansion connector of said computer main body;
a register in which programmable clock drive control information for designating one of enable and disable of a drive operation of a clock signal line of said device is set;
a clock drive unit, coupled to said register and said clock signal line having a buffer circuit for one of enabling and disabling the drive operation of said clock signal line of said device in accordance with the clock drive control information set in said register; and
means for setting the clock drive control information in said register to disable the drive operation of said clock signal line of said device until said expansion unit is connected to said expansion connector of said computer main body, and rewriting the clock drive control information in said register to enable the drive operation of said clock signal line of said device when said detection means detects that said expansion unit is connected to said expansion connector of said computer main body.

4. A system according to claim 3, wherein said buffer circuit of said clock driver unit has means for switching stepwise a current driving capability for driving said clock signal line in accordance with the clock drive control information set in said register.

5. A system according to claim 3, wherein said expansion unit has a second device connected, through said expansion connector, to a clock signal line driven by, said clock drive unit, and
said setting means comprises
means for setting the clock drive control information in said register to disable the drive operation of said clock signal line of said second device until said expansion unit is connected to said expansion connector of said computer main body, and rewriting the clock drive control information in said register to enable the drive operation of said clock signal line of said second device when said detection means detects that said expansion unit is connected to said expansion connector of said computer main body.

6. A computer system comprising:
a computer main body; and
an expansion unit which is detachably connected to said computer main body, and on which expansion devices can be mounted;
said computer main body including:
a system bus;
a first device connected to said system bus;
a system memory connected to said system bus;
a storage medium for storing a device driver program for controlling an operation of said first device;
an expansion connector for detachably connecting said expansion unit to said computer main body;
a second device connected between said system bus and said expansion connector and serving as an interface between said system bus and said expansion unit;
first and second clock signal lines for supplying clock signals to said first and second devices, respectively;
a register in which programmable clock drive control information is set for designating one of enable and disable of a drive operation of said first and second clock signal lines;
a clock drive unit coupled to said register and said first and second clock signal lines, having first and second buffer circuits for one of enabling and disabling the drive operation of said first and second clock signal lines in accordance with the clock drive control information set in said register;
means for reading the device driver program stored in said storage medium into said system memory; and
means for setting the clock drive control information in said register to disable the drive operation of said clock signal line of said first device in an initial state, rewriting the clock drive control information in said register to enable the drive operation of said clock signal line of said first device when the device driver program of said first device is read by said reading means into said system memory, setting the clock drive control information in said register to disable drive to said clock signal line of said second device until said expansion unit is connected to said expansion connector of said computer main body, and rewriting the clock drive control information in said register to enable the drive operation of said clock signal line of said second device when said detection means detects that said expansion unit is connected to said expansion connector of said computer main body.

7. A system according to claim 6, wherein said buffer circuit of said clock drive unit has means for switching stepwise a current driving capability for driving said clock signal line in accordance with the clock drive control information set in said register.

8. A system according to claim 6, wherein said expansion unit has a third device connected, through said expansion connector, to a clock signal line driven by said clock drive unit, and
said setting means comprises
means for setting the clock drive control information in said register to disable the drive operation of said clock signal line of said third device until said expansion unit is connected to said expansion connector of said computer main body, and rewriting the clock drive control information in said register to enable the drive operation of said clock signal line of said third device when said detection means detects that said expansion unit is connected to said expansion connector of said computer main body.

9. A computer system comprising:
a memory slot in which a memory module can be mounted;
memory clock signal lines connected to a plurality of memory banks;
a register of which programmable clock drive control information for designating one of enable and disable of a drive operation of said memory clock signal lines corresponding to said plurality of memory banks is set;
a clock drive unit, coupled to said register and said clock signal lines, having a plurality of buffer circuits for one of enabling and disabling the drive operation of said memory clock signal lines of said plurality of memory banks in accordance with the clock drive control information set in said register; and
means for checking a memory bank structure of said memory module mounted in the memory slot and rewriting the clock drive control information in said register to disable drive of said memory clock signal lines connected to unused banks.

10. A system according to claim 9, wherein said buffer circuit of said clock drive unit has means for switching stepwise a current driving capability for driving said memory clock signal line in accordance with the clock drive control information set in said register.

11. A computer system comprising:
a system bus;
a plurality of devices connected to said system bus;
clock signal lines coupled to said plurality of devices for supplying clock signals to said plurality of devices;
a system memory connected to said system bus;
a storage medium for storing device driver programs for controlling operation of said plurality of devices;
a first register in which programmable clock drive control information for designating one of enable and disable of a drive operation of said clock signal lines in units of said devices is set;
a first clock drive unit, coupled to said first register and said clock signal lines having a plurality of buffer circuits for one of enabling and disabling the drive operation of said clock signal lines of said plurality of devices in accordance with the clock drive control information set in said first register;
means for reading the device driver programs stored in said storage medium into said system memory;
first rewrite means for setting the clock drive control information in said register to disable the drive operation of said clock signal lines of said plurality of devices in an initial state, and rewriting the clock drive control information in said register to enable the drive operation of said clock signal lines of said devices controlled by the read device driver programs when the device driver programs of said plurality of devices are read by said read means into said system memory;
a memory slot in which a memory module can be mounted;
memory clock signal lines connected to a plurality of memory banks;
a second register in which programmable clock drive control information for designating one of enabled and disable of the drive operation of said memory clock signal lines corresponding to said plurality of memory banks in set;
a second clock drive unit, coupled to said second register and said memory clock signal lines, having a plurality of buffer circuits for one of enabling and disabling the drive operation of said memory clock signal lines of said plurality of memory banks in accordance with the clock drive control information set in said second register; and
a second rewrite means for checking a memory bank structure of said memory module mounted in the memory slot and rewriting the clock drive control information in said second register to disable the drive operation of said memory clock signal lines connected to unused banks.

12. A system according to claim 11, wherein said buffer circuit of said first and second clock drive units has means for switching stepwise a current driving capability for driving said clock signal lines connected to said devices and said memory clock signal lines in accordance with the clock drive control information set in said first and second registers.

13. A computer system comprising:
a computer main body; and
an expansion unit which is detachably connected to said computer main body, and on which expansion devices can be mounted;
said computer main body including:
a system bus;
an expansion connector for detachably connecting said expansion unit to said computer main body;
a device connected between said system bus and said expansion connector and serving as an interface between said system bus and said expansion unit;
detection means for detecting that said expansion unit is connected to said expansion connector of said computer main body;
a first register in which programmable clock drive control information for designating one of enable and disable of a drive operation of a clock signal line of said device is set;
a first clock drive unit, coupled to said first register and said clock signal line, having a buffer circuit for one of enabling and disabling the drive operation of said clock signal line of said device in accordance with the clock drive control information set in said first register;
first rewrite means for setting the clock drive control information in said first register to disable the drive operation of said clock signal line of said device until said expansion unit is connected to said expansion connector of said computer main body, and rewriting the clock drive control information is said first register to enable the drive operation of said clock signal line of said device when said detection means detects that said expansion unit is connected to said expansion connector of said computer main body;
a memory slot in which a memory module can be mounted;
memory clock signal lines connected to a plurality of memory banks;
a second register in which programmable clock drive control information for designating one of enable and disable of the drive operation of said memory clock signal lines corresponding to said plurality of memory banks is set;

a second clock drive unit, coupled to said second register and said second clock signal lines, having a plurality of buffer circuits for one of enabling and disabling the drive operation of said memory clock signal lines of said plurality of memory banks in accordance with the clock drive control information set in said second register; and second rewrite means for checking a memory bank structure of said memory module mounted in the memory slot and rewriting the clock drive control information in said second register to disable the drive operation of said memory clock signal lines connected to unused banks.

14. A system according to claim 13, wherein said buffer circuit of said first and second clock drive units has means for switching stepwise a current driving capability for driving said clock signal lines connected to said devices and said memory clock signal lines in accordance with the clock drive control information set in said first and second registers.

15. A computer system comprising:

a system bus;

a plurality of devices connected to said system bus;

a register in which programmable clock drive control information is set for designating a current value for clock drive in units of said devices; and a clock drive unit, coupled to said register and said clock signal lines, having a plurality of buffer circuits for driving clock signal lines of said plurality of devices to supply a clock signal to each of said devices, said buffer circuit switching stepwise a current driving capability for driving said clock signal line in accordance with the clock drive control information set in said register.

16. A computer system comprising:

a system bus;

a plurality of devices connected to said system bus;

a first register in which programmable clock drive control information is set for designating pernission/inhibition of clock supply in units of said devices;

a first clock drive unit, coupled to said first register and said clock signal lines, having a plurality of buffer circuits for driving clock signal lines of said plurality of devices to supply a clock signal to each of said devices, said buffer circuit permitting/inhibiting a drive operation of said clock signal line in accordance with the clock drive control information set in said register;

a memory slot in which various memory modules can be mounted;

a second register in which programmable clock drive control information for designating one of permission and inhibition of memory clock supply to a plurality of memory banks is set; and a second clock drive unit, coupled to said second register and said memory clock signal lines, having a plurality of buffer circuits for driving memory clock signal lines connected to said plurality of memory banks to supply a clock signal to each of said memory banks, said buffer circuit for one of permitting and inhibiting a drive operation of said memory clock signal line in accordance with the clock drive control information set in said register, wherein said buffer circuit of said first and second clock drive units has means for switching stepwise a current driving capability for driving said clock signal lines connected to said devices and said memory clock signal lines in accordance with the clock drive control information set in said first and second registers.

* * * * *